(12) United States Patent
Chung et al.

(10) Patent No.: US 7,177,541 B2
(45) Date of Patent: Feb. 13, 2007

(54) OSNR MONITORING METHOD AND APPARATUS FOR THE OPTICAL NETWORKS

(75) Inventors: Yun-Chur Chung, Taejon (KR); Jun-Haeng Lee, Kyonggi-Do (KR)

(73) Assignee: TeraLink Communications, Inc., Daejeon (KR)

( * ) Notice: Subject to any disclaimer, the term of this patent is extended or adjusted under 35 U.S.C. 154(b) by 512 days.

(21) Appl. No.: 10/148,438

(22) PCT Filed: Nov. 9, 2001

(86) PCT No.: PCT/KR01/01914

§ 371 (c)(1),
(2), (4) Date: May 30, 2002

(65) Prior Publication Data

US 2003/0090755 A1    May 15, 2003

(51) Int. Cl.
*H04B 10/08* (2006.01)
(52) U.S. Cl. .............. 398/26; 398/25; 398/27; 398/33; 398/38; 398/34; 398/37; 398/140; 398/141; 398/147; 398/148; 398/158; 398/159; 398/160; 398/208; 398/209; 398/214; 398/94; 398/152
(58) Field of Classification Search ............ 398/26, 398/33, 25, 38, 140, 141, 147, 148, 152, 398/27, 34, 37, 94, 158, 159, 160, 208, 209, 398/214
See application file for complete search history.

(56) References Cited

U.S. PATENT DOCUMENTS

| | | | | |
|---|---|---|---|---|
| 5,050,949 A | * | 9/1991 | DiGiovanni et al. | 359/337.4 |
| 5,677,781 A | * | 10/1997 | Mori et al. | 398/26 |
| 5,917,649 A | * | 6/1999 | Mori et al. | 359/341.31 |
| 6,396,051 B1 | * | 5/2002 | Li et al. | 250/227.18 |
| 6,577,792 B2 | * | 6/2003 | Brennen et al. | 385/37 |
| 2001/0005277 A1 | * | 6/2001 | Laming | 359/341 |
| 2004/0114923 A1 | * | 6/2004 | Chung et al. | 398/26 |

* cited by examiner

*Primary Examiner*—Hanh Phan
(74) *Attorney, Agent, or Firm*—Harness, Dickey & Pierce, P.L.C.

(57) ABSTRACT

It is disclosed that a method and apparatus that automatically monitors each channel's optical signal-to-noise ration (OSNR) using optical filter and polarization extinction method in wavelength division multiplexing (WDM) scheme-based optical transmission systems. OSNR is simply measured using optical filter by comparing amplified spontaneous emission (ASE) over the signal band, of which bandwidth has changed, while leaving signal intensity intact, with that original signal and, OSNR measurement is allowable over a wider range of OSNR by minimizing the ratio of signal to ASE over the signal band using polarization extinction method.

7 Claims, 7 Drawing Sheets

OSNR MONITORING METHOD AND APPARATUS FOR THE OPTICAL NETWORKS

TECHNICAL FIELD OF THE INVENTION

The present invention relates to OSNR monitoring method and apparatus for the optical networks. More particularly, the invention relates to method and apparatus that automatically monitors each channel's optical signal-to-noise ratio using optical filter and polarization extinction method in wavelength division multiplexing scheme-based optical transmission systems.

BACKGROUND ART

Recently, as Wavelength Division Multiplexing (WDM) optical transmission techniques come into practical use, the transmission capacity of optical transmission systems has rapidly enhanced up to over 1 Tb/s.

In order to operate and maintain reliably the optical transmission systems of such an ultra-large capacity, it is very important to accurately monitor Optical Signal-to-Noise Ratio (OSNR) of transmitted signal.

OSNR is defined as the ratio of signal power to noise power contained over the signal band. So transmission performance of an optical transmission system can be represented by OSNR.

In WDM optical communication networks, since each channel comes through different paths, it has different OSNR each other.

Therefore, it is not accurate to linearly predict noise intensity over the signal band from the intensity of amplified spontaneous emission (ASE) outside the signal band as proposed in the past. [Refer to H. Suzuki and N. Takachio, "Optical signal quality monitor built into WDM linear repeaters using semiconductor arrayed waveguide grating filter monolithically integrated with eight photodiodes," Electronics Letter, Vol. 35, pp. 836–837, 1999.]

Recently, there is proposed a method where each channel's OSNR is measured using polarization characteristics of optical signal and ASE. [Refer to D. K. Jung, C. H. Kim, and Y. C. Chung, "OSNR monitoring technique using polarization-nulling method," OFC 2000, Baltimore, March 2000, Paper WK4.]

However, the above method is limited in its application scope due to the phenomenal fact that signal's degree of polarization (DOP) is lowered after transmission because of polarization mode dispersion (PMD) and nonlinear birefringence. [Refer to J. H. Lee, D. K. Jung, C. H. Kim, and Y. C. Chung, "OSNR monitoring technique using polarization-nulling method," IEEE Photon. Technol. Lett., vol. 12, no. 1, pp 88–90, 2001.]

DISCLOSURE OF INVENTION

It is an object of the present invention to resolve the aforementioned problems and, therefore, to provide a simple OSNR monitoring method and apparatus for the optical networks using an optical filter of which passband is identical to that of signal, by comparing ASE over the signal band, of which bandwidth has changed, while leaving signal intensity intact, with that original signal.

It is another object of the present invention to provide OSNR monitoring method and apparatus for the optical networks which allow monitoring over a wider range of OSNR by minimizing the ratio of signal to ASE over the signal band using polarization extinction method.

It is also an object of the present invention to provide an economic and efficient OSNR monitoring method and apparatus for the optical networks which allow automatic monitoring using optical filter, automatic polarization controller, and polarization beam splitter.

It is further another object of the present invention to provide an economic and efficient OSNR monitoring method and apparatus for the optical networks which exclude the effect of polarization mode dispersion and nonlinear birefringence that limit the usage scope of monitoring method using only polarization extinction method in the prior art.

To achieve the aforementioned object, the present invention provides OSNR monitoring method for the optical networks that is characterized to measure OSNR by changing ASE bandwidth using an optical filter of which passband is identical to the wavelength of each WDM signal transmitted in the WDM optical transmission system.

To achieve the aforementioned object, the present invention provides OSNR monitoring apparatus for the optical networks which comprises; 1:1 directional coupler splitting ASE-contained optical signal in WDM optical communication system into two; optical filter changing ASE bandwidth for one of the above two signals; photodetector converting, into voltage signals, the other optical signal and the optical signal which has changed the bandwidth; and computer measuring OSNR using voltage of the photodetector as input.

BEST MODE FOR CARRYING OUT THE INVENTION

Figure 1:
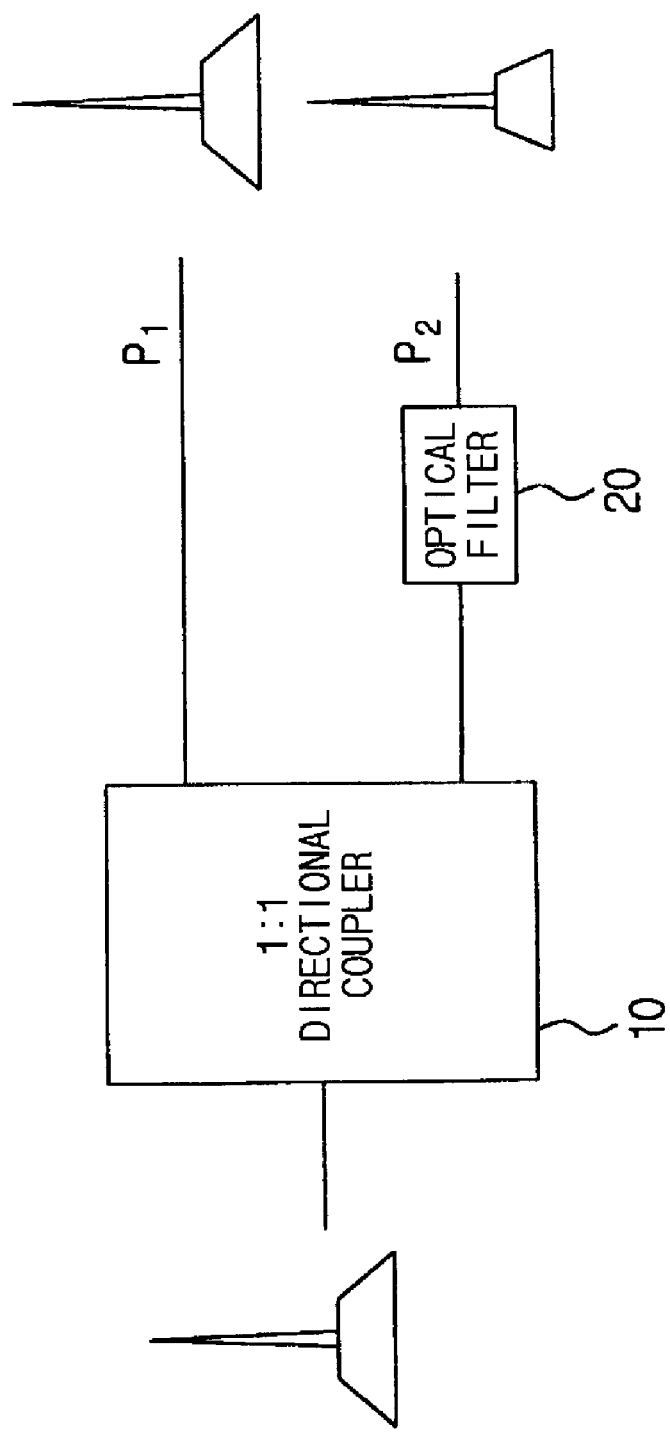
FIG. 1 is a diagram representing the principle of monitoring method for optical signal-to-noise ratio (OSNR) according to an embodiment of the present invention.

FIG. 1 is a diagram representing the principle of OSNR monitoring method according to the present invention.

If optical signal containing amplified spontaneous emission (ASE) is split into two by using directional coupler (10) and then one of the two is passed through optical filter (20)

whose center wavelength is identical to the signal wavelength, the signal intensity stays the same but the ASE bandwidth gets changed.

Therefore, measured optical power ($P_1$, $P_2$) can be described by the following equations.

$$P_1 = P_{signal} + S_{ASE}B_1 \quad [\text{Eqn.1}]$$

$$P_2 = P_{signal} + S_{ASE}B_2 \quad [\text{Eqn.2}]$$

Here, $P_{signal}$ represents signal intensity in watt, $S_{ASE}$ represents power density of ASE in watt/nm, and $B_1$ and $B_2$ represent bandwidth of ASE in nm, respectively.

Using Eqn.1 and Eqn.2 above, signal intensity and power density of ASE can be represented by the following equations, respectively.

$$P_{signal} = (P_2B_1 - P_1B_2)/(B_1 - B_2) \quad [\text{Eqn.3}]$$

$$S_{ASE} = (P_1 - P_2)(B_1 - B_2) \quad [\text{Eqn.4}]$$

Therefore, after obtaining OSNR by using Eqn.3 and Eqn.4, OSNR is finally represented by the following equation with given resolution of Br(nm).

$$OSNR = \frac{P_{signal}}{S_{ASE}B_r} = \frac{P_2B_1 - P_1B_2}{(P_1 - P_2)B_r} \quad [\text{Eqn. 5}]$$

The OSNR monitoring method according to the present method utilizes the fact that if optical signal containing ASE is passed through optical filter (20) whose center wavelength of passband is identical to signal wavelength, then signal intensity stays the same but ASE bandwidth gets changed. Therefore, signal intensity and power densities of ASE are obtained by comparing powers before and after passing through the optical filter (20), and OSNR is determined by inputting these values into Eqn.5.

Figure 2:
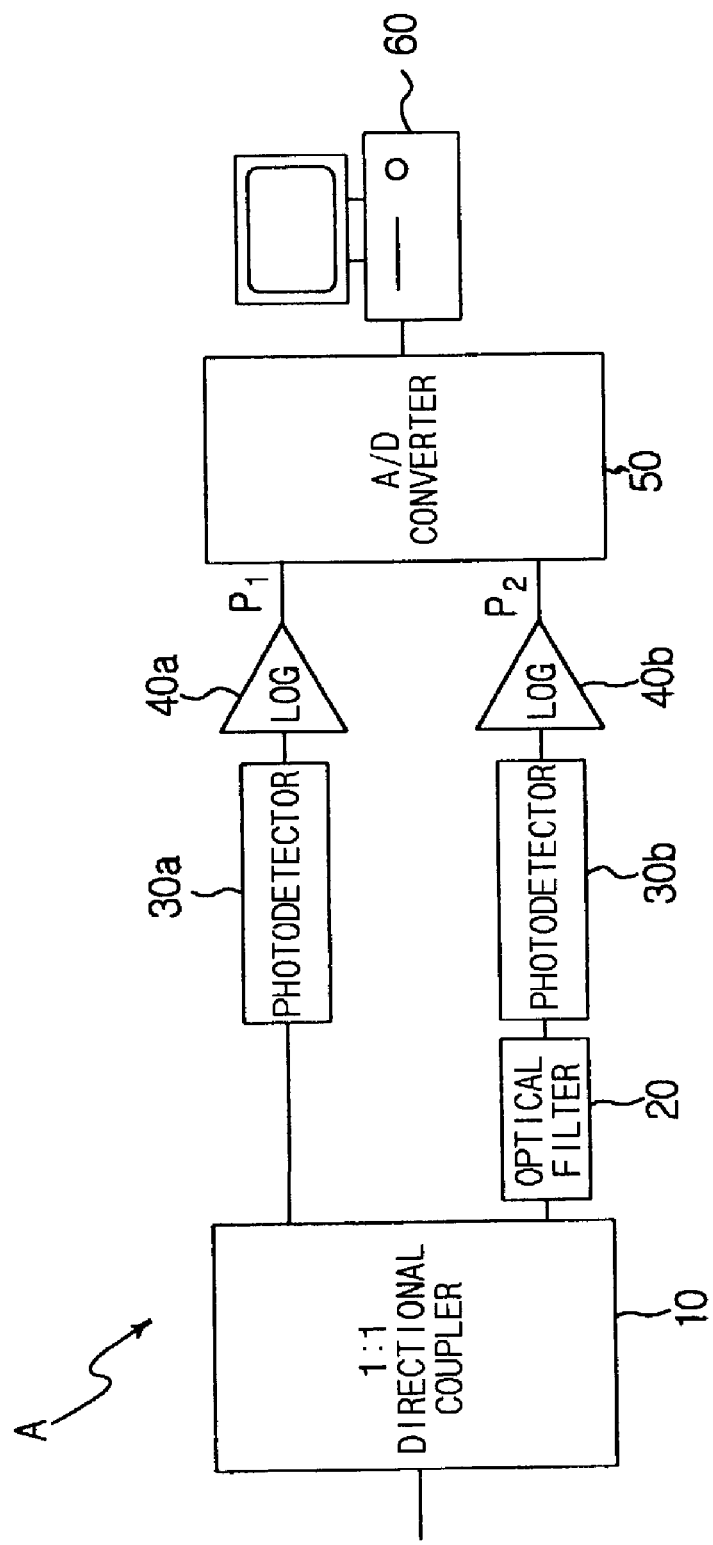
FIG. 2 is a block diagram of OSNR monitoring apparatus implemented according to an embodiment of the present invention of OSNR monitoring method.

FIG. 2 is a block diagram of OSNR monitoring apparatus (A) implemented according to the present invention of OSNR monitoring method.

To split the input optical signal into two, 1:1 directional coupler (10) is used.

One of the split signals is converted into voltage by photodetector (30a), amplified by logarithmic amplifier (40a), converted into digital signal by A/D converter (50), and then input to computer (60).

The other signal, after passing through optical filter (20), is similarly converted into voltage by photodetector (30b), amplified by logarithmic amplifier (40b), converted into digital signal by A/D converter (50), and then input to computer (60).

Now, the computer (60) is ready to measure OSNR by applying the two input voltages to Eqn.5.

Figure 3:
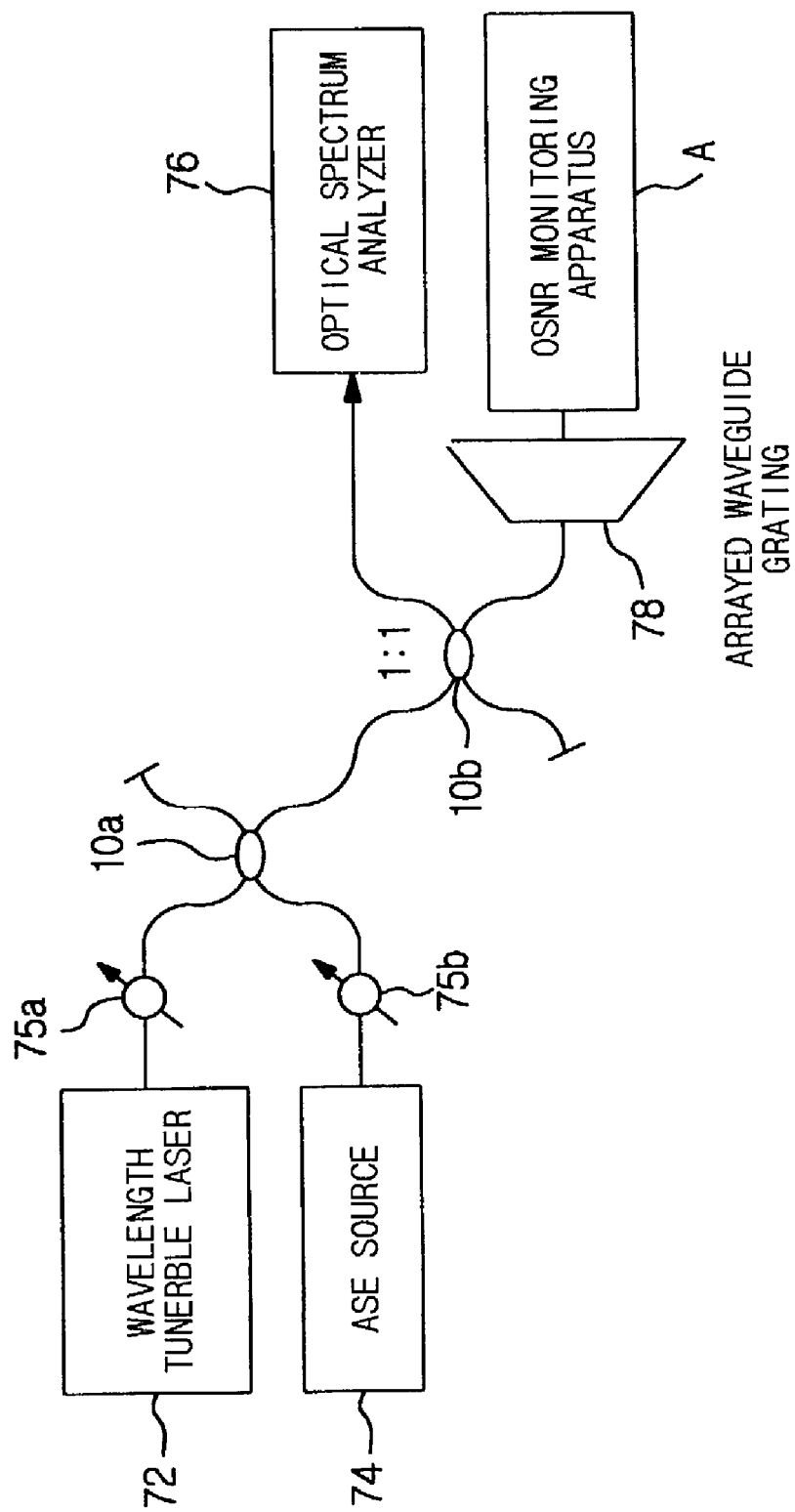
FIG. 3 is a block diagram of experimental system to prove the validity of OSNR monitoring method according to an embodiment of the present method.

FIG. 3 is a block diagram of experimental system to prove the validity of OSNR monitoring method according to the present method.

Wavelength tunable laser (72) is provided to generate optical signal, while erbium-doped fiber amplifier (EDFA) is provided as source (74) for generating ASE.

Once 1:1 directional coupler (10a) combines signal and ASE, then 1:1 directional coupler (10b) again splits the combined signal and ASE into two.

One of the two is input to optical spectrum analyzer (76), and OSNR is measured by linear prediction method.

Here, since signal bandwidth is narrow while ASE bandwidth is wide and flat, OSNR measured by linear prediction can be said to be accurate.

The other of the two is passed through arrayed waveguide grating (78) for demultiplexing, and then input to OSNR monitoring apparatus (A) according to the present invention for measuring OSNR.

The channel spacing and passband of arrayed waveguide grating (78) used as demultiplexer are 1.6 nm and 0.944 nm, respectively, and passband of optical filter (20) used for OSNR monitoring apparatus (A) is 0.668 nm.

Using optical variable attenuators (75a, 75b) installed downstream each of wavelength tunable laser (72) and ASE source (74), OSNR can be varied by increasing or decreasing signal power and ASE quantity.

Figure 4:
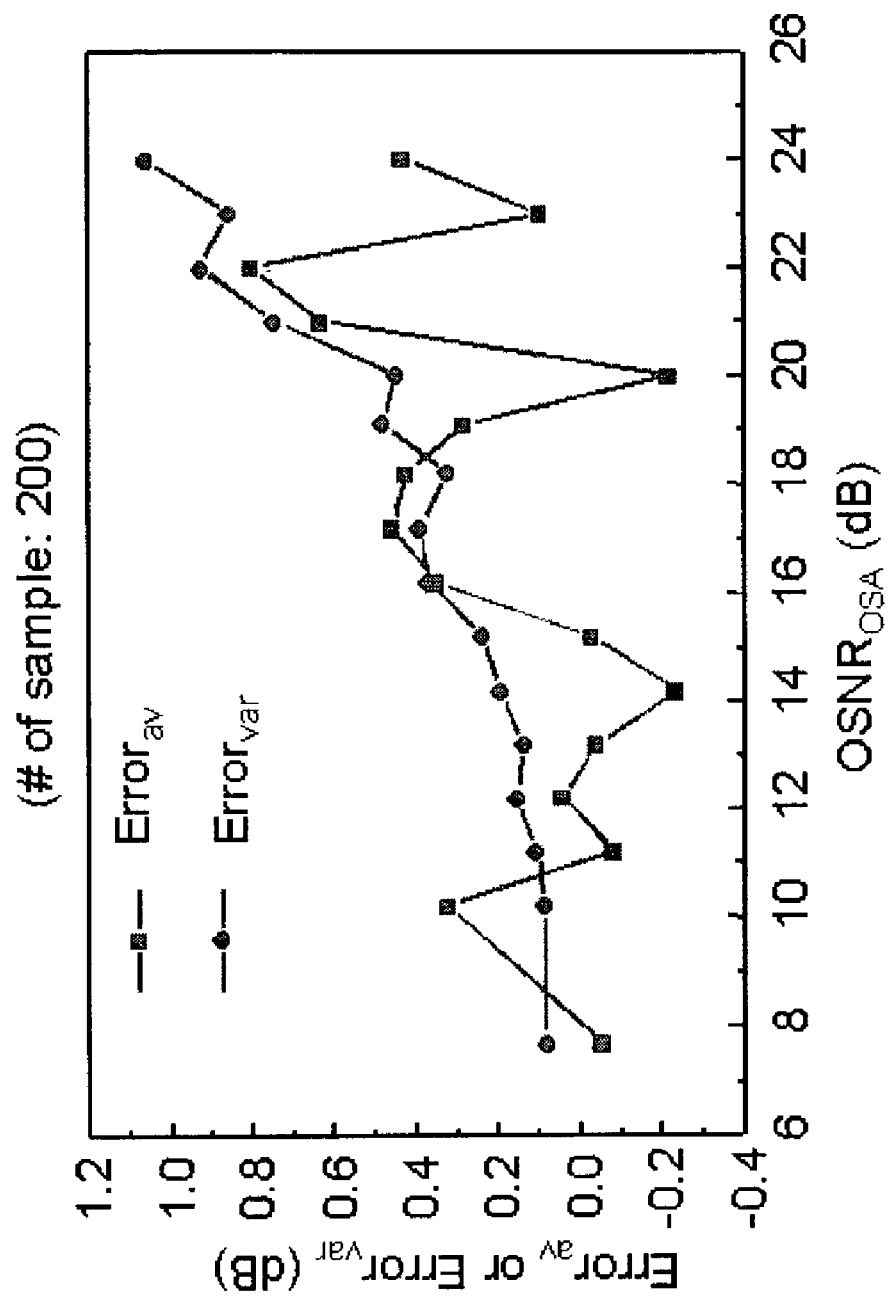
FIG. 4 is a graph showing errors of OSNR measured by OSNR monitoring apparatus according to an embodiment of the present invention against OSNR measured by optical spectrum analyzer.

FIG. 4 is a graph showing of error results ($Error_{av}$), averaged over 200 measurements, of OSNR measured using OSNR monitoring apparatus (A) according to the present invention against OSNR measured by optical spectrum analyzer (76).

As can be seen in the results, two measured OSNR's are in good agreement, the maximum error being within 1 dB.

However, it is observed that variance of errors ($Error_{var}$) tends to increase as OSNR becomes large.

This is attributed to the fact that, since ASE intensity becomes smaller compared to signal as OSNR becomes large, because of the limit of measurement resolution, i.e., resolution of A/D converter (50), larger errors are involved in OSNR calculation.

However, this problem can be resolved by averaging measured OSNR's over many times.

In the present invention, it is proposed to enhance the accuracy by keeping OSNR low enough using polarization extinction method.

Figure 5:
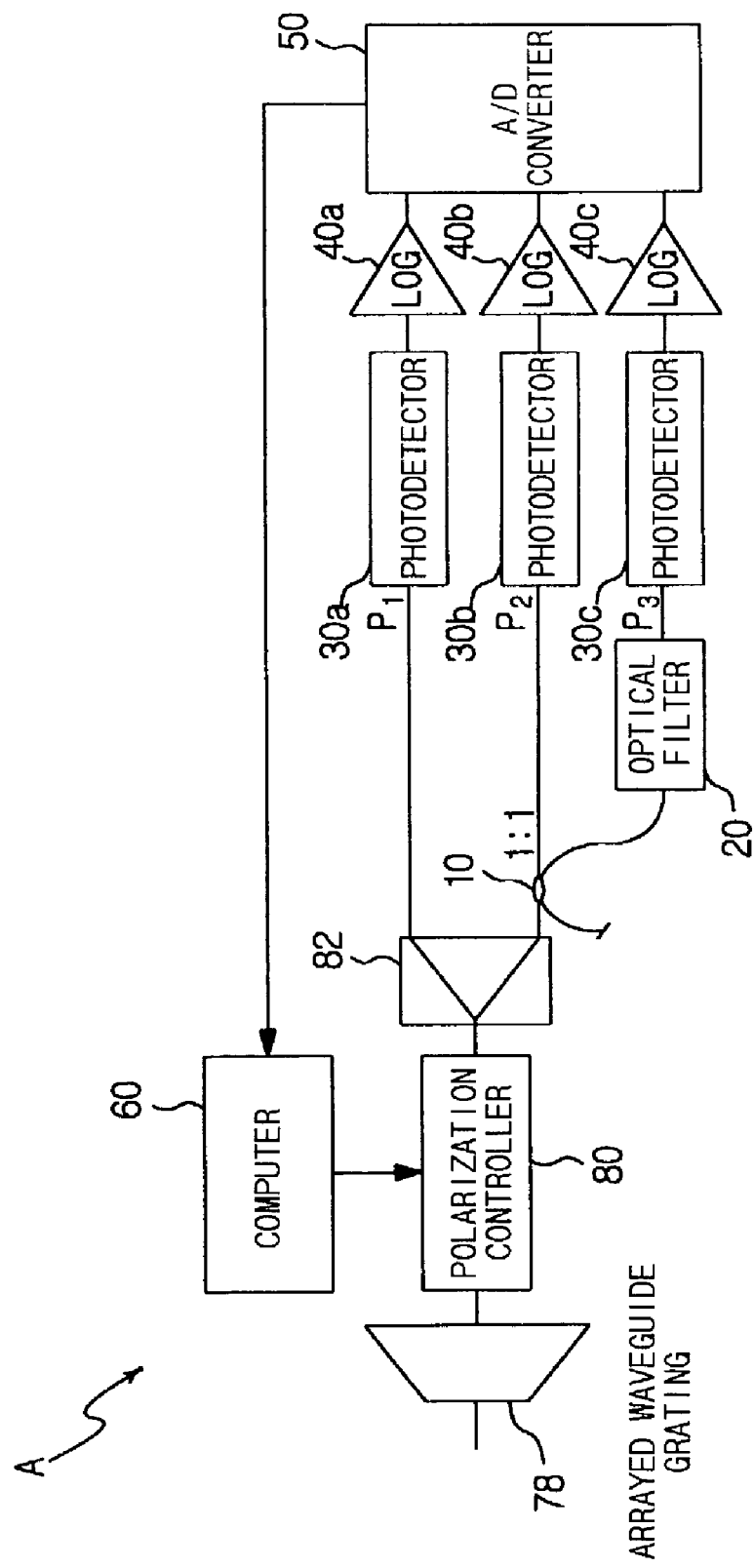
FIG. 5 is a diagram representing the principle of method to enhance the accuracy of OSNR monitoring method according to the present invention using polarization extinction method.

FIG. 5 explains the principle of high-accuracy OSNR monitoring method using both optical filter (20) and polarization extinction method simultaneously.

After passing ASE-contained signal through automatic polarization controller (80), the signal is split into two perpendicularly polarized elements by polarization beam splitter (82).

Linear optical transformer may be used in place of the above polarization beam splitter (82).

One of the two split polarized elements is again split using directional coupler (10) into two, one of which is passed through optical filter (20).

Here, in order to make ASE bandwidth after passing narrower than that before passing, bandwidth of optical filter (20) is made to be narrower than that of arrayed waveguide grating used as multiplexer.

Now, the three split powers can be represented as follows:

$$P_1 = P_{signal}(1-\epsilon) + 0.5 S_{ASE}B_1 \quad [\text{Eqn.6}]$$

$$P_2 = 0.5 P_{signal}\epsilon + 0.25 S_{ASE}B_1 \quad [\text{Eqn.7}]$$

$$P_3 = 0.5 P_{signal}\epsilon + 0.25 S_{ASE}B_2 \quad [\text{Eqn.8}]$$

Here, $\epsilon$ represents polarized component of signal that is excluded from $P_1$.

Each of the above three powers ($P_1, P_2, P_3$) is measured by photodetector (30a, 30b, 30c), amplified by logarithmic amplifier (40a, 40b, 40c), converted into digital signal by A/D converter (50), and then input to computer (60) for use in OSNR calculation.

On using Eqn.6 through Eqn.8, OSNR is obtained as in Eqn.9.

$$OSNR = \frac{P_{signal}}{S_{ASE}B_r} = \frac{(P_1 + 2P_2)}{4(P_2 - P_3)}\frac{B_1 - B_2}{B_r} - \frac{B_1}{B_r} \quad [\text{Eqn. 9}]$$

Here, for the sake of more accurate OSNR measurement, polarization controller (80) before polarization beam splitter (82) is automatically adjusted to minimize $\epsilon$ so that signal intensities contained in $P_2$ and $P_3$ are minimized.

In other words, if quantity of signal component contained in the two measurements ($P_2$ and $P_3$) is made smaller than or comparable to ASE intensity, ASE intensity can be predicted more accurately even with the limited resolution of measuring devices.

Therefore, if polarization extinction method is used, one can implement a more accurate OSNR monitoring method.

Here, if extinction ratio of polarization beam splitter (82) is assumed infinity, $\epsilon$ becomes zero.

In this case, the system reduces to the same constitution as in the prior art, and OSNR can be calculated without Eqn.8.

However, since polarization beam splitter (82) has a finite extinction ratio and polarization adjustment is not complete in reality, $\epsilon$ does not become zero.

Also, non-nullified value of $\epsilon$ can be attributed to polarization mode dispersion and nonlinear birefringence.

Polarization mode dispersion means time difference between signal components proceeding along two polarization axes caused due to polarization property of fiber or optical elements when optical signal is transmitted over optical lines.

Sine this polarization mode dispersion is sensitive to surrounding environment such as ambient temperature and atmospheric pressure, it changes as time goes on.

Nonlinear birefringence is type of birefringence that arises due to change of refractive index of fiber caused by optical signal intensity. Therefore, when a multiplicity of intensity modulated optical signals are transmitted on single fiber simultaneously, nonlinear birefringence changes the polarization state of adjacent channel rapidly.

Since this change of polarization depends on polarizational relation between channels, the effect due to nonlinear birefringence also changes as time goes on.

Therefore, $\epsilon$ resulted from polarization mode dispersion and nonlinear birefringence changes as time passes, which causes unpredictable errors in OSNR measurement using only polarization extinction method.

In case of OSNR monitoring method according to the present invention, on the other hand, even though $\epsilon$ varies as time passes, accurate OSNR can be predicted by considering the effect of change of $\epsilon$ in real time.

Therefore, OSNR monitoring method according to the present invention can be credited to eliminate the effects of polarization mode dispersion and nonlinear birefringence that have been limitation factors of OSNR monitoring method using polarization extinction method in the prior art.

Figure 6:
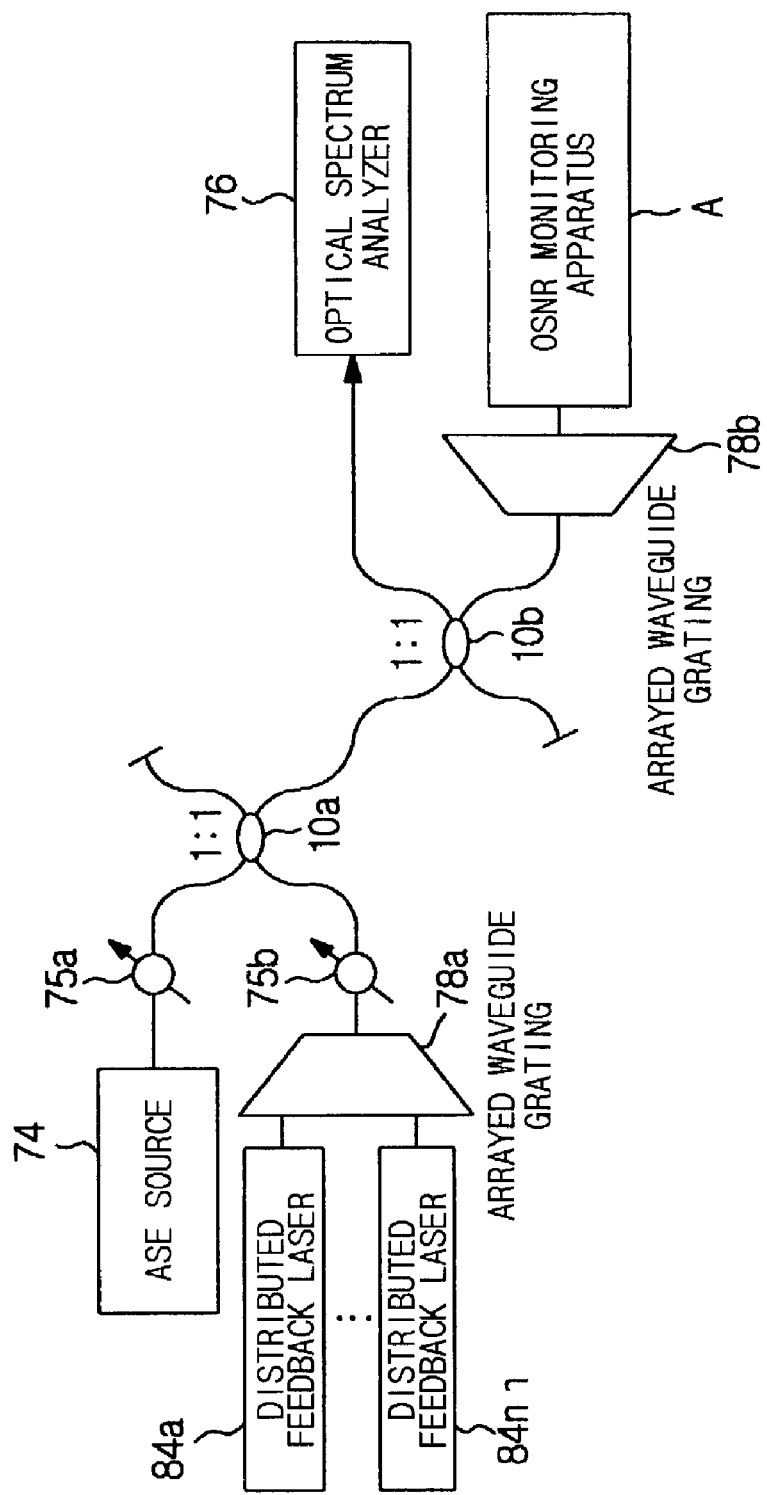
FIG. 6 is a block diagram of experimental system to prove the validity of OSNR monitoring method according to the present method using polarization extinction method.

FIG. 6 is a block diagram of experimental system to prove the validity of OSNR monitoring method according to the present method using polarization extinction method.

Here, WDM optical signal is provided by multiplexing output signal from eight distributed feedback lasers (84a, . . . ,84n) with channel spacing of 1.6 nm by use of arrayed waveguide grating (78a), while ASE is provided by using erbium-doped fiber amplifier as ASE source (74).

Signal and ASE coupled by 1:1 directional coupler (10a) is again split by 1:1 directional coupler (10b) into two.

One part of the two is input to optical spectrum analyzer (76), measuring OSNR by linear prediction method.

Here, since signal bandwidth is narrow while ASE bandwidth is wide and flat, linear prediction can be said to yield accurate measurement results.

The other part of the two is passed through arrayed waveguide grating (78b) for demultiplexing and input to OSNR monitoring apparatus (A) for measuring OSNR.

The arrayed waveguide grating (78b) used as demultiplexer has channel spacing and passband of 1.6 nm and 0.944 nm, respectively.

Using optical variable attenuators (75a, 75b) installed downstream each of ASE source (74) and arrayed waveguide grating (78a), OSNR can be varied by increasing or decreasing signal power and ASE quantity.

Figure 7:
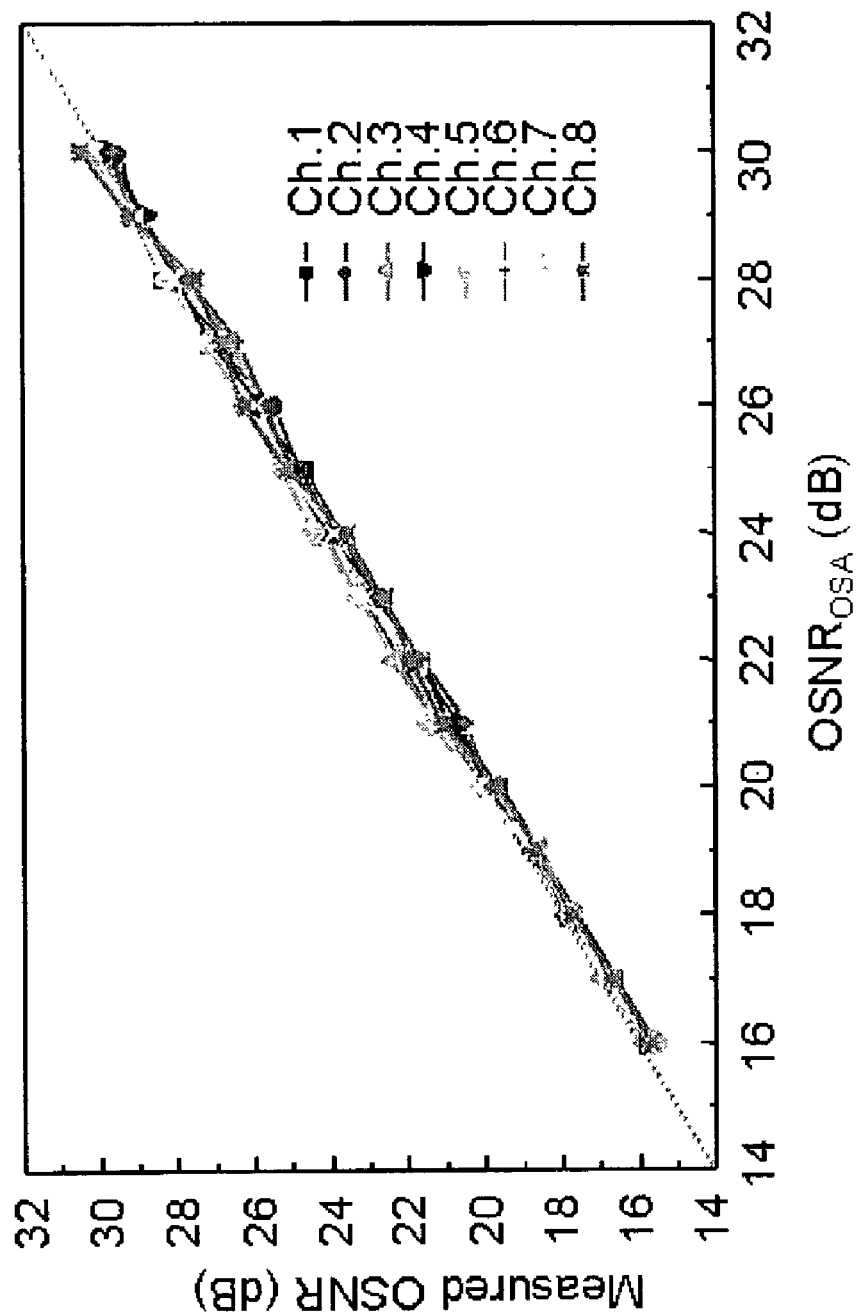
FIG. 7 is a graph showing errors of OSNR measured using OSNR monitoring apparatus according to the present invention using polarization extinction method against OSNR measured by optical spectrum analyzer.

FIG. 7 is a graph showing errors of OSNR measured using OSNR monitoring apparatus (A) according to the present invention using polarization extinction method against OSNR measured by optical spectrum analyzer (76).

As shown in the results, measured OSNR is in good agreement for all eight channels, the maximum error being as low as 0.3 dB.

INDUSTRIAL APPLICABILITY

As shown above, since OSNR monitoring method according to the present invention is implemented using only optical filter and directional coupler, its constitution is simple and economical. Moreover, it can be improved for monitoring over wider range simply by adding automatic polarization controller and polarization beam splitter.

The OSNR monitoring method according to the present invention is proposed to overcome, by simply adding optical filter, the limitation of OSNR monitoring method using polarization extinction method that includes polarization mode dispersion and nonlinear birefringence.

The invention claimed is:

1. An OSNR monitoring method for the optical networks characterized;
   to measure OSNR by changing ASE bandwidth using optical filter whose passband is identical to wavelength of each WDM signal transmitted on Wavelength Division Multiplexing (WDM) scheme-based optical transmission system,
   wherein OSNR is continuously measured by repeating a series of processes comprising:
   process in which signal containing said ASE is split into two, process in which one of the two is measured as the first power, process in which the other of the two is measured as the second power after reducing the ASE bandwidth using said optical filter whose passband is identical to the optical signal wavelength, and
   process in which signal intensity and ASE intensity are obtained from said two measurements of the first power and the second power.

2. An OSNR monitoring method for the optical networks of claim 1, wherein
   OSNR is measured by the following Equation 10.

$$OSNR = \frac{P_{signal}}{S_{ASE}B_r} = \frac{P_2 B_1 - P_1 B_2}{(P_1 - P_2)B_r}, \quad [\text{Eqn. 10}]$$

where $P_1$ and $P_2$ indicate the first and the second measured powers, $P_{signal}$ indicates signal intensity in watt, $S_{ase}$ indicates power density of ASE in watt/nm, $B_1$ and $B_2$ indicate bandwidths of ASE associated with the first and the second powers in nm, and $B_r$ indicates resolution in nm, respectively.

3. An OSNR monitoring method for the optical networks characterized;
to measure OSNR under the condition that signal-to-noise ratio is minimized by using polarization characteristic of each Wavelength Division Multiplexing signal transmitted on Wavelength Division Multiplexing (WDM) scheme-based optical transmission systems, and
in measuring ASE power containing signal components due to polarization mode dispersion and nonlinear birefringence, intensity of said signal component contained in ASE is removed by using an optical filter whose passband is identical to the signal wavelength,
wherein OSNR is continuously measured by repeating a series of processes comprising;
process in which said ASE is split into two perpendicularly polarized components,
process in which one of the two is measured as the first power,
process in which the other of the two is again split into two, one of which is measured as the second power and the other of which is measured as the third power after reducing the ASE bandwidth using said optical filter whose passband is identical to the optical signal wavelength, and
process in which signal intensity and ASE intensity are obtained from said three measurements of the first, second, and third powers.

4. An OSNR monitoring method for the optical networks of claim 3, wherein,
OSNR is measured by the following Equation 11.

$$OSNR = \frac{P_{signal}}{S_{ASE}B_r} = \frac{(P_1 + 2P_2)}{4(P_2 - P_3)} \frac{B_1 - B_2}{B_r} - \frac{B_1}{B_r}, \quad [\text{Eqn. 11}]$$

wherein $P_1$ and $P_2$, and $P_3$ indicate the first, the second, and the third measured powers, $P_{signal}$ indicates signal intensity in watt, $S_{ase}$ indicates power density of ASE in watt/nm, $B_1$ indicates bandwidth of ASE associated with the first and the second power in nm, and $B_2$ indicates bandwidth of ASE associated with the third power in nm, and $B_r$ indicates resolution in nm, respectively.

5. An OSNR monitoring apparatus for the optical networks comprising;
1:1 directional coupler splitting ASE-containing optical signal into two on Wavelength Division Multiplexing (WDM) scheme-based optical transmission system,
optical filter changing ASE bandwidth of one of said two signals,
photodetector converting, into voltage, the other of said two signals and said one signal whose bandwidth gets changed, and
computer measuring OSNR using output voltage of said photodetector as input.

6. An OSNR monitoring apparatus for the optical networks comprising:
polarization controller controlling ASE-contained optical signal on Wavelength Division Multiplexing (WDM) scheme-based optical transmission system,
polarization beam splitter splitting said optical signal passed through said polarization controller into two perpendicularly polarized components,
1:1 directional coupler splitting one of said two perpendicularly polarized components into two signals,
optical filter changing ASE bandwidth of one of said two signals split by said directional coupler,
photodetector converting, into voltage, the other component of said two components split by said polarization beam splitter, the other optical signal of said two signals split by said directional coupler, and said one signal whose bandwidth gets changed by said optical filer, and
computer measuring OSNR using output voltage of said photodetector as input.

7. An OSNR monitoring apparatus for the optical networks of claim 6 further comprising;
logarithmic amplifier amplifying said voltage converted by said photodetector and
A/D converter converting analog quantity of said amplified voltage into digital quantity.

* * * * *